US007576161B2

(12) United States Patent
Stokes et al.

(10) Patent No.: US 7,576,161 B2
(45) Date of Patent: Aug. 18, 2009

(54) PROCESS FOR PREPARING TERMINALLY FUNCTIONALIZED LIVING AND QUASILIVING CATIONIC TELECHELIC POLYMERS

(75) Inventors: Casey D. Stokes, Novato, CA (US); Robson F. Storey, Hattiesburg, MS (US); James J. Harrison, Novato, CA (US)

(73) Assignees: Chevron Oronite Company LLC, San Ramon, CA (US); The University of Southern Mississippi, Hattiesburg, MS (US)

(*) Notice: Subject to any disclaimer, the term of this patent is extended or adjusted under 35 U.S.C. 154(b) by 559 days.

(21) Appl. No.: 11/186,157

(22) Filed: Jul. 20, 2005

(65) Prior Publication Data
US 2005/0282972 A1 Dec. 22, 2005

Related U.S. Application Data

(62) Division of application No. 10/600,898, filed on Jun. 19, 2003, now Pat. No. 6,969,744.

(51) Int. Cl.
C08C 19/02 (2006.01)
C08C 19/22 (2006.01)
(52) U.S. Cl. ............... 525/375; 525/333.7; 525/338
(58) Field of Classification Search ............ 525/333.7, 525/338, 375
See application file for complete search history.

(56) References Cited

U.S. PATENT DOCUMENTS

| | | | |
|---|---|---|---|
| 3,632,600 A | 1/1972 | Morris | |
| 4,342,849 A | 8/1982 | Kennedy | |
| 4,486,572 A | 12/1984 | Kennedy | |
| 4,758,631 A | 7/1988 | Kennedy et al. | |
| 4,814,405 A | 3/1989 | Kennedy | |
| 4,910,321 A | 3/1990 | Kennedy et al. | |
| 4,943,616 A | 7/1990 | Mishra et al. | |
| 4,946,899 A | 8/1990 | Kennedy et al. | |
| 5,032,653 A | 7/1991 | Cheradame et al. | |
| 5,122,572 A | 6/1992 | Kennedy et al. | |
| 5,169,914 A | 12/1992 | Kaszas et al. | |
| 5,225,492 A | 7/1993 | Kennedy et al. | |
| 5,340,881 A | 8/1994 | Kennedy et al. | |
| 5,350,819 A | 9/1994 | Shaffer | |
| 5,395,885 A | 3/1995 | Kennedy et al. | |
| 5,444,135 A | 8/1995 | Cheradame et al. | |
| 5,448,000 A | 9/1995 | Gullapalli et al. | |
| 5,451,647 A | 9/1995 | Faust et al. | |
| 5,506,316 A | 4/1996 | Shaffer | |
| 5,580,935 A | 12/1996 | Shaffer | |
| 5,629,394 A | 5/1997 | Cheradame et al. | |
| 5,663,470 A | 9/1997 | Chen et al. | |
| 5,690,861 A | 11/1997 | Faust | |
| 5,777,044 A | 7/1998 | Faust | |
| 5,945,491 A | 8/1999 | Matyjaszewski et al. | |
| 6,033,446 A * | 3/2000 | Cherpeck et al. | .............. 44/340 |
| 6,194,597 B1 | 2/2001 | Faust et al. | |
| 6,407,066 B1 | 6/2002 | Dressen et al. | |
| 6,515,083 B2 | 2/2003 | Ozawa | |
| 6,642,318 B1 | 11/2003 | Chiefari et al. | |
| 6,753,391 B1 | 6/2004 | Lewandowski et al. | |
| 6,818,716 B2 | 11/2004 | Wendland et al. | |

FOREIGN PATENT DOCUMENTS

| | | |
|---|---|---|
| EP | 0 397 081 A2 | 11/1990 |
| EP | 1 209 170 A1 | 5/2002 |
| WO | WO 94/13706 | 6/1994 |
| WO | WO 99/09074 | 2/1999 |

OTHER PUBLICATIONS

J.P. Kennedy and Atsushi Hayashi, Living Carbocationic Polymerization. XXXIX. Isobutylene Polymerization in the Presence of Pyridine and Various Other Electron Donors, J. Marcromol. Sci.—Chem., A28(2), pp. 197-207 (1991) by Marcel Dekker, Inc.
R.J. Keaton, Living Ziegler-Natta Polymerization, (2002) http://www.chem.wayne.edu/acs_organic_division/essay_2002/keaton. pdf, Oct. 22, 2003 retrived.
R. Faust and J.P. Kennedy, Living Carbocationic Polymerization. XXI. Kinetic and Mechanistic Studies of Isobutylene Polymerization Initiated by Trimethylpentyl Esters of Different Acids, J. Marcromol. Sci.—Chem., A27(6), pp. 649-667 (1990) by Marcel Dekker, Inc.
B. Koroskenyl and R. Faust, Initiation Via Haloboration in Living Cationic Polymerization. 6. A Novel Method for the Synthesis of Primary Amine Functional Polyisobutylenes. J.M.S.—Pure Appl. Chem., A36(12), pp. 1879-1893 (1999) by Marcel Dekker, Inc.
M. Roth and H. Mayr, A Novel Method for the Determination of Propagation Rate Constants: Carbocationic Oligomerization of Isobutylene, Macromolecules (1996), 29, pp. 6104-6109 American Chemical Society.
S. Hadjikyriacou and R. Faust, Living Coupling Reaction in Living Cationic Polymerization. 3. Coupling Reaction of Living Polyisobutylene Using Bis(furanyl) Derivatives, Macromolecules (2000), 33, 730-733 American Chemical Soceity.
Database WPI Section Ch, Week 197201 Derwent Publications Ltd., London GB; AN 1972-00713T XP002316480-& SU 293 804 (ND Zelinskii Organic Chem) Jan. 26, 1971 *abstract*.

* cited by examiner

Primary Examiner—Roberto Rábago
(74) Attorney, Agent, or Firm—Joseph P. Foley; Claude J. Caroli

(57) ABSTRACT

Disclosed is a method of preparing terminally functionalized telechelic polymers using a cationic living polymer product or a terminal tert-chloride chain end of a carbocationic quasiliving polymer product, which comprises quenching the polymer product with an N-substituted pyrrole to thereby functionalize the N-substituted pyrrole at the terminal reactive polymer chain end(s). Also disclosed are the terminal functionalized polyisobuyl N-substituted pyrrole compounds where the polyisobutyl group is substituted at the 2 and 3 position of the N-substituted pyrrole.

25 Claims, No Drawings

PROCESS FOR PREPARING TERMINALLY FUNCTIONALIZED LIVING AND QUASILIVING CATIONIC TELECHELIC POLYMERS

FIELD OF THE INVENTON

The present invention relates to the manufacture and synthetic method for producing monodisperse telechelic polymers through cationic polymerization of a suitable monomer under living polymerization conditions and quenching the polymerization with an N-substituted pyrrole. These functionalized polymers containing N-substituted pyrroles may be employed as fuel additives and/or lubricating additives. For example, in a fuel composition or lubricating oil composition, such an additive is particularly useful as a detergent-dispersant. A particularly preferred embodiment of this invention relates to a polyisobutyl N-substituted pyrrole prepared via carbocationic polymerization.

BACKGROUND OF THE INVENTION

While almost all monomers containing carbon-carbon double bonds undergo radical polymerization, ionic polymerization is highly selective. This due in part to the stability of the propagating species. Cationic polymerization involves carbenium ions and is essentially limited to those monomers with an electron releasing substituent such as alkoxy, phenyl, vinyl and 1,1-dialkyl; while anionic polymerization involves carbanions and requires monomers possessing electron withdrawing groups such as nitrile, carboxyl, phenyl and vinyl.

Compared to carbanions, which maintain a full octet of valence electrons, carbenium ions are deficient by two electrons and are much less stable and therefore, controlled cationic polymerization requires specialized systems. The instability or high reactivity of the carbenium ions facilitates undesirable side reactions such as bimolecular chain transfer to monomer, β-proton elimination, and carbenium ion rearrangement, all of which limit the control over the cationic polymerization. Typically, low temperatures are necessary to suppress these reactions. Additionally, other considerations such as stabilization of the propagating centers (typically by appropriate choice of counterion and solvent system), use of additives to suppress ion-pair dissociation and undesirable protic initiation, and the use of high-purity reagents to prevent the deactivation of the carbenium by heteroatomic nucleophiles (such as alcohols or amines) are often required. However, if one carefully selects the system, cationic polymerization can display living characteristics.

Through these living cationic systems, cationic polymerization can be controlled to yield tailored polymers with narrow molecular weight distributions and precisely controlled molecular weight, micro-architecture, and end group functionality. Controlled cationic polymerizations are deemed to be achieved under conditions in which chain end termination is reversible (quasiliving conditions) and undesirable reactions such as chain transfer and water-initiation are suppressed. A tremendous advantage of living and quasiliving polymerization is the opportunity for one-pot in situ functionalization of the polymer by reaction of the living chain ends with an appropriate quenching reagent. Historically, commercial functionalization of oil and fuel additive polymers has been a complex multi-step process. However, commercial implementation of in situ functionalization could reduce the time, energy, and overall cost associated with the production of oil and fuel additives. For example, polyisobutene-based oil dispersants are typically produced by first polymerizing isobutene (IB) to form an olefin-terminated polyisobutene (PIB), reacting the PIB with maleic anhydride to form PIB-succinic anhydride (PIBSA), and then reacting PIBSA with a polyamine to form a PIB-succinimide amine. In total, the dispersant requires three synthetics steps; each stage requires separate reaction conditions and exhibits less than 100% yield.

Living polymerizations refer to any polymerization during which propagation proceeds with the exclusion of termination and chain transfer and thus yields polymers retaining (virtually indefinitely) their ability to add further monomer whenever it is supplied to the system. This description is often too rigorous for actual systems and is approximated herein by quasiliving carbocationic polymerization (QLCCP), which includes chain growth polymerizations that proceed in the absence of irreversible chain breaking mechanisms during the effective lifetime of monomer consumption.

With the advent of carbocationic living polymerization and QLCCP, there have been attempts to functionalize these living polymers. The extent of success of these attempts has been directly linked to the type of monomer being polymerized. Simple one pot (or in situ) chain end functionalization of more reactive carbocationic monomers, like isobutyl vinyl ether, can occur using ionic nucleophilic quenching reagents, i.e. methanol, alkyl lithium etc., Sawamoto, et al. *Macromolecules*, 20, 1, (1987). However chain end functionalization does not occur when these reagents are added to living polymerization of less reactive monomers such as isobutylene, Fodor et al. *Polym Prepr. Amer. Chem. Soc.*, 35(2), 492 (1994). Addition of these reagents at the end of polymerization resulted in the consumption of the catalyst and the formation of tert-alkyl chloride chain ends on the polyisobutylene (PIB) rather than the desired nucleophilic substitution. This represented a trivial result since QLCCP of IB produces tert-chloride end groups anyway, as a direct consequence of the inherent, reversible termination mechanism in these polymerization systems.

Functionalization of quasiliving PIB has typically been attempted through the use of functional initiators and through in situ functionalization by quenching. Most past efforts to produce functionality by quenching of quasiliving chains has failed and has led to the tert-chloride terminus, *J. Macromol. Sci-Chem*, A27, 649 (1990) and *Polym. Bull*, 18, 123 (1987). The accepted rationale is that quasiliving PIB is composed primarily of dormant (reversibly terminated) chains. Thus, most added reagents, particularly strong nucleophiles, quench the Lewis acid co-initiator and therefore yield only the tert-chloride chain end. Tert-chloride groups are often undesirable as a dispersant/detergent for lubricants and fuels due to environmental reasons and since their presence may decrease the effectiveness of controlling soot and other engine contaminants. Additionally, tert-chloride groups tend to decompose, liberating HCl, which is corrosive toward metal surfaces within the engines. The most notable exception to the above general rule was the discovery that allyltrimethylsilane (ATMS), when added in excess to living polyisobutylene, does not react with the Lewis acid but rather is alkylated by the PIB chain end, thereby providing living PIB with allylic ends groups in situ, U.S. Pat. No. 4,758,631. A related U.S. Pat. No. 5,580,935 teaches the use of alkylsilylpseudohalides as quenching agents, thereby adding to the choice of chemistries. However, functionalization of the cationic polymers in situ with suitable nitrogen compounds for use in dispersants and/or detergents has been elusive.

Based upon the success of ATMS, Faust et al. investigated 2-substituted furan derivatives and found that quantitative reaction with quasiliving PIB chain ends could be achieved in both titanium tetrachloride (TiCl₄) and BCl₃ co-initiated systems; *Macromolecules* 32, 6393 (1999) and *J Macromol., Sci Pure Appl. Chem.* A37, 1333, (2000). Similarly, Ivan in WO 99/09074 disclosed quenching quasiliving PIB with furan derivatives and thiophene derivatives while postulating that any aromatic ring, preferably 5-7 membered heterocycles as well as optionally substituted moieties could be employed to quench and effectively functionalize QLCP PIB through electrophilic aromatic substitution. We have now found that there is particularity of the aromatic ring, the substituent group on the ring, as well as the position of the substituent group on the ring. Incorrect selection of the aromatic ring or substituent, such as substituents which contain certain nucleophile segments (such as —OH, —NH₂) can deactivate the catalyst and render the PIB chain end unaffected and carrying only tert-Cl end groups, or in certain circumstances, couple the quasiliving polymer. The present invention is based partly on the discovery that monodisperse telechelic polymers can be produced by cationic polymerization of a suitable monomer under living polymerization conditions and that quenching the polymerization with an N-substituted pyrrole yields PIB with desirable nitrogen-containing end functionality. Such N-substituted pyrroles are unique since they contain a tertiary nitrogen atom with the lone pair of electrons taking part in the aromatic sextet of electrons in the 5-membered, aromatic pyrrole ring and surprisingly, produce high yields of monodispersed chain end functionalized polymer.

SUMMARY OF THE INVENTION

The present invention relates to the manufacture and synthetic method for producing monodisperse telechelic polymers through cationic polymerization of a suitable monomer under living polymerization conditions and quenching the polymerization with an N-substituted pyrrole. Particularly, the present invention is directed to functionalization of a living or quasiliving polymer product by reacting and covalently bonding an N-substituted pyrrole to the carbocationic propagating center. Surprisingly, an N-substituted pyrrole employed as quenching agent to a living polymer or quasiliving polymer system can produce high amounts of monofunctional polymers having a single terminal N-substituted pyrrole group. Additionally, bi- and multifunctional terminal N-substituted pyrrole groups can be formed depending on the functionality and micro-architecture of the living polymer. This method can be carried out with substantially no coupling and preferably less than 10 weight percent coupling based upon total polymer produced. Additionally, these N-substituted pyrroles can be substituted at the nitrogen position, with a particular group of less reactive nucleophiles which do not complex with the catalyst system, and thus provide a unique opportunity to add other functional groups to the resulting polymer product.

Accordingly, disclosed is a method for preparing an in situ telechelic polymer functionalized by having a heteroatomic chain end group comprising quenching a cationic living polymer product or a terminal tert-chloride chain end of a carbocationic quasiliving polymer product in the presence of a Lewis acid, with an N-substituted pyrrole of formula I:

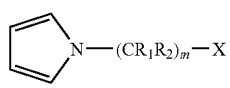

formula I wherein:
R₁ and R₂ are independently in each —(CR₁R₂)— unit selected from the group consisting of hydrogen and alkyl from C₁ to C₆ carbon atoms;
m is an integer from 1 to 20; and
X is selected from the group consisting of hydrogen, alkyl, aryl, alkaryl, alkoxy, heteroaryl, nitro, ureido, —OC(O)R₃, —C(O)R₄, —C(O)OR₅, —C(O)NR₆R₇, —P(R₈)₃, —P(OR₉)₃, —SR₁₀, —OSO₃R₁₁, and —S(O)R₁₂; wherein R₃ is alkyl or alkenyl; and R₄, R₅, R₆, R₇, R₈, R₉, R₁₀, R₁₁, and R₁₂ are alkyl; and Preferably R₁ and R₂ are selected so that the carbon adjacent to the nitrogen of the pyrrole has at least one hydrogen and more preferably this adjacent carbon is a —CH₂— group. More preferably R₁ and R₂ are hydrogen, and when R₁ and R₂ are hydrogen, X is preferably other than alkyl, most preferably hydrogen. In a most preferred embodiment, m is an integer from 1 to 4, with m equal to 1 being particularly preferred.

Particularly preferred X groups are selected from the group consisting of hydrogen, alkyl, aryl, alkaryl, alkoxy, heteroaryl, nitro, ureido, —OC(O)R₃, —C(O)R₄, —C(O)OR₅, and —C(O)NR₆R₇, where R₃, R₄, R₅, R₆ and R₇ are defined above. An especially preferred X group is heteroaryl, even more preferred said heteroaryl is selected from the group consisting of furan, thiophene and pyridine. Another preferred X group is —OC(O)R₃ wherein R₃ is alkenyl selected from the group consisting of ethenyl, n-propenyl and isopropenyl, and more preferably ethenyl.

This method can have a further step of contacting the resulting product formed above with a hydrogenation agent under reactive conditions. This invention is also directed to the product produced according to the method above as well as the product produced according to the further step of contacting the resulting product formed above with a hydrogenation agent under reactive conditions.

Suitable quasiliving polymer products having terminal tert-chloride chain end(s) can be pre-made by various methods. Thus, for example the quasiliving polymer product can be formed by hydrochlorinating a premade polymer, and quenching in the presence of a Lewis acid and solvent under suitable quasiliving polymerization reaction conditions More preferably these quasiliving polymer products can be made in situ, thus leading to one-pot functionalization reactions. Preferably the quasiliving polymer is formed by contacting at least one cationically polymerizable monomer with an initiator, in the presence of a Lewis acid and solvent under suitable quasiliving polymerization reaction conditions. A particularly preferred at least one cationically polymerizable monomer is selected from the group consisting of isobutene, 2-methyl-1-butene, 3-methyl-1-butene, 4-methyl-1-pentene, and beta-pinene. A particularly preferred Lewis acid is TiCl₄. Preferably this quasiliving polymer is then quenched with the N-substituted pyrrole of formula I after about 98 percent monomer conversion and prior to significant aging, which can lead to undesired side reactions. The initiator, as the name implies, provides a suitable propagation center to begin the cationic polymerization. Thus the initiator can be monofunctional, having one such propagation center, bifunctional, having two propagation centers, or multifunctional, which can lead to the formation of star polymers. Preferably the initiator is monofunctional and more preferably the initiator is selected from the group consisting of 2-chloro-2-phenylpropane; 2-acetyl-2-phenylpropane; 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, and 2-ethoxy-2,4,4-trimethylpentane. Most preferably the initiator is 2-chloro-2,4,4-trimethylpentane, especially when a single monomer such as isobutene is used. Thus, suitable cationically polymerizable monomers can be single monomer, i.e. a homopolymer; or selected from at least two cationically monomers, i.e. copolymers.

A class of preferred products produced in accordance with the method of this invention, can be characterized by having a narrow molecular weight distribution Mw/Mn of less than 1.5 and more preferably less than about 1.2. In another aspect, class of preferred products produced in accordance with the method of this invention, can be characterized by a molecular weight range of from 500 to 500,000 g/mol and generally up to 100,000 g/mol which are useful as lubricant additives.

The method described above can be used for the manufacture and synthesis of polymers having terminal N-substituted pyrrole group(s). Accordingly, another aspect of this invention is directed to the products produced by these methods.

Another aspect of this invention is directed to polyisobutyl N-substituted pyrrole compounds which are useful as detergent and/or dispersant additives. Accordingly, this invention is directed to a compound of the formula II:

formula II wherein:
$R_1$ and $R_2$ are independently in each $—(CR_1R_2)—$ unit selected from the group consisting of hydrogen and alkyl from $C_1$ to $C_6$ carbon atoms;
m is an integer from 1 to 20; and
X is selected from the group consisting of hydrogen, alkyl, aryl, alkaryl, alkoxy, heteroaryl, nitro, ureido, $—OC(O)R_3$, $—C(O)R_4$, $—C(O)OR_5$, $—C(O)NR_6R_7$, $—P(R_8)_3$, $—P(OR_9)_3$, $—SR_{10}$, $—OSO_3R_{11}$, and $—S(O)R_{12}$; wherein $R_3$ is alkyl or alkenyl; and $R_4$, $R_5$, $R_6$, $R_7$, $R_8$, $R_9$, $R_{10}$, $R_{11}$, and $R_{12}$ are alkyl; and
n is an integer from 0 to 2000.

Preferably $R_1$ and $R_2$ are selected so that the carbon adjacent to the nitrogen of the pyrrole has at least one hydrogen and more preferably this adjacent carbon is a $—CH_2—$ group. More preferably $R_1$ and $R_2$ are hydrogen, and when $R_1$ and $R_2$ are hydrogen, X is preferably other than alkyl, most preferably hydrogen. In a most preferred embodiment, m is an integer from 1 to 4, with m equal to 1 being particularly preferred.

Particularly preferred X groups are selected from the group consisting of hydrogen, alkyl, aryl, alkaryl, alkoxy, heteroaryl, nitro, ureido, $—OC(O)R_3$, $—C(O)R_4$, $—C(O)OR_5$, and $—C(O)NR_6R_7$, where $R_3$, $R_4$, $R_5$, $R_6$ and $R_7$ are defined above. An especially preferred X group is heteroaryl, even more preferred said heteroaryl is selected from the group consisting of furan, thiophene and pyridine. Another preferred X group is $—OC(O)R_3$ wherein $R_3$ is alkenyl selected from the group consisting of ethenyl, n-propenyl and iso-propenyl, and more preferably ethenyl.

Preferred compounds of formula II are selected wherein n is an integer from about 1 to 1000, more preferred from 2 to 500, and even more preferred from 3 to 260. Particularly preferred compounds for use in fuel additives are when n is from 3 to about 20 and for as dispersants and lubricating additives when n is from 5 to about 50 and when used as a viscosity index improver then n is typically from 140 to about 260.

The polyisobutyl N-substituted pyrrole compounds of the above formula II are typically mixtures having the PIB group attached to the N-substituted pyrrole at the 2 and 3 position of the pyrrole. Based upon the reaction conditions as well as the relative bulkiness of the substituent on the 1 position of the pyrrole, the reaction can favor a predominant position. Additionally, suitable separation technologies such as chromatography, zone electrophoresis and the like can be employed. Accordingly, substantially 2-polyisobutyl N-substituted pyrrole or 3-polyisobutyl N-substituted pyrrole can be formed. As used above, the term "substantially", refers to having greater than 75% of the specified isomer and preferably greater than 90%.

The present invention further provides a fuel composition comprising a major amount of hydrocarbons boiling in the gasoline or diesel range and an effective deposit-controlling amount of the compound according to formula II.

DETAILED DESCRIPTION OF THE INVENTION

As used herein, the following terms have the following meanings.

The term "telechelic polymer" refers to polymers having one or more end groups wherein the end group has the capacity to react with another molecule or perform a specific function. Polymers having one reactive end group per molecule are said to be monofunctional. Polymers having two reactive chain ends per molecule are said to be bifunctional. Polymers having more than two reactive chain ends per molecule are said to be multifunctional.

The term "alkyl" refers to straight and branched chain saturated aliphatic groups typically having from 1 to 20 carbons atoms, and more preferably 1 to 6 atoms ("lower alkyl"). This term is exemplified by the groups such as methyl, ethyl, propyl butyl, isopropyl, isobutyl, sec-butyl, tert-butyl, and the like.

The term "substituted alkyl" refers to an alkyl group as described above, having from 1 to 5 substituents, selected from the group consisting of alkoxy, aryl, heteroaryl, nitro, ureido, $—NHC(O)NH_2$, $—OC(O)$alkyl, $—OC(O)$alkenyl, and $—C(O)R$, where R is halogen, alkoxy, or N,N-dialkyl amino.

The term "alkoxy" refers to the group alkyl-O—. Preferred alkoxy groups are represented by, for example, methoxy, ethoxy, n-propoxy, iso-propoxy, n-butoxy, tert-butoxy, sec-butoxy, n-pentoxy, n-hexoxy, 1,2-dimethylbutoxy, and the like.

The term "alkenyl" refers to a monovalent branched or unbranched unsaturated hydrocarbon group preferably having from 2 to 20 carbon atoms, more preferably 2 to 10 and even more preferably 2 to 6 carbon atoms and having at least 1 and preferably from 1-2 sites of vinyl unsaturation. Preferred alkenyl groups include ethenyl ($—CH=CH_2$), n-propenyl ($—CH_2CH=CH_2$), iso-propenyl ($—C(CH_3)=CH_2$), and the like.

The term "aryl" refers to an unsaturated aromatic carbocyclic group from 6 to 20 carbon atoms, preferably 6-10 carbon atoms, having a single ring (e.g. phenyl) or multiple condensed (fused) rings (e.g., napthyl or anthryl). Preferred aryls include phenyl, naphthyl and the like.

Unless otherwise constrained by the definition for the aryl substituent, such aryl groups can optionally be substituted with from 1 to 5 substituents, preferably 1 to 3 substituents selected from the group consisting of alkyl, alkoxy, acyl, alkylsulfanyl, alkylsufonyl, alkyl sulfenyl, alkylcarbonyl, alkyoxycarbonyl, aminocarbonyl, aminocarbonylamino, halo, cyano, nitro, and the like.

The term "heteroaryl" refers to an aromatic carboxcylic group from 1 to 15 carbon atoms and 1 to 4 heteroatoms selected from oxygen, nitrogen, and sulfur within at least one ring. Examples of "heteroaryl" used herein are furan, thiophene, pyrrole, imidazole, pyrazole, triazole, tetrazole, thiazole, oxazole, isooxazole, oxadiazole, thiadiazole isothiazole, pyridine, pyridazine, pyrazine, pyrimidine, quinoline, isoquinoline, benzofuran, benzothiophene, indole indazole, and the like.

The term "ureido" refers to urea derivatives having the general structure —NHC(O)NHR' where R' is hydrogen, alkyl, aryl and the like. Preferably, R' is hydrogen.

Living polymerization is known in the art and may be achieved using a variety of systems, some of which are described in U.S. Pat. Nos. 5,350,819; 5,169,914; and 4,910, 321. As used herein, living carbocationic polymerization systems can comprise ideal living polymerization, based on cationic initiation in which the rates of chain transfer and termination are zero or indistinguishable from zero, and quasiliving polymerization in which reversible termination is operable, but the rates of chain transfer and irreversible termination are zero or indistinguishable from zero. Suitable systems disclosed in the art for living carbocationic polymerization are for instance: t-alkyl esters (or ethers or chlorides)/ $BCl_3$; cumyl acetate/$TiCl_4$; $CH_3SO_3H/SnCl_4+n-Bu_4NCl$. Even more preferred systems are hexane/MeCl/$TiCl_4$/2,6-dimethylpyridine (2,6-DMP)/–70° C.; MeCl/$BCl_3$/2,6-DMP/–40° C.; 1,2-$EtCl_2$/$BCl_3$/2,6-DMP/–10° C. Even more preferable are those systems employing isobutylene as the monomer and that are initiated with 2-chloro-2,4,4-trimethyl pentane (TMPCl) and/or by 5-tert-butyl-1,3,-di(1chloro-1-methyl ethyl) benzene (TBDCC). An important aspect to quasiliving cationic polymerization is the use of a reaction system in which the propagating centers are of sufficiently low reactivity so that transfer and termination reactions are suppressed but not so unreactive that propagation by a suitable cationic monomer is suppressed. This is facilitated by appropriately matching the stability of the carbocationic center with a suitable counterion complex, solvent polarity, polymerization temperature, other additives, etc.

Some typical conditions under which living polymerizations can be achieved, typified for isobutylene include:

(1) an initiator comprising a tertiary alkyl halide, a tertiary aralkyl halide, a tertiary alkyl ether, a tertiary aralkyl ether, a tertiary alkyl ester, a tertiary aralkyl ester, or the like;

(2) a Lewis acid co-initiator, which typically comprises a halide of titanium, boron, tin or aluminum;

(3) optionally, a proton scavenger and/or electron donor or salt;

(4) a solvent whose dielectric constant is selected considering the choice of the Lewis acid and the monomer in accord with known cationic polymerization systems; and (5) monomers.

Initiator compounds for living carbocationic polymerization are known in the art. The type of contemplated initiator compounds can be represented by the general formula (X'—$CR_aR_b)_nR_c$ wherein $R_a$, $R_b$, and $R_c$ are independently selected from the group consisting of alkyl, aryl, aralkyl or alkaryl groups, and can be the same or different, and X' is an acetate, etherate, hydroxyl group, or a halogen. $R_c$ has a valance of n, and n is an integer of 1 to 4. Preferably $R_a$, $R_b$, and $R_c$ are hydrocarbon groups containing 1 to 20 carbon atoms, preferably 1 to 8 carbons atoms. Preferably X' is a halogen and more preferably chloride. In some instances it is preferably to select the structure of $R_a$, $R_b$, and $R_c$ to mimic the growing species or monomer, e.g. a 1-phenylethyl derivative for polystyrene or 2,4,4-trimethyl pentyl derivative for polyisobutene. Suitable compounds, include for example, cumyl, dicumyl and tricumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri (cumylmethyl ether), and similar compounds. Other suitable examples can be found in U.S. Pat. No. 4,946,899. Particularly preferred examples are 2-chloro-2,4,4-trimethyl pentane (TMPCl), 1,3,5 tri(2-chloro-2-propyl)benzene, and 5-tert-butyl-1,3,-di(2-chloro-2-propyl) benzene (TBDCC).

Select Lewis acids are suitable as catalysts for purposes of the invention. In some instances these Lewis acids are also referred to as co-initiators, and both terms are used herein. Such compounds include, but are not limited to the titanium and boron halides, particularly titanium tetrachloride and boron trichloride, aluminum trichloride, tin tetrachloride, zinc chloride, ethyl aluminum dichloride and others. Use of the titanium halides and particularly titanium tetrachloride is preferred. The strength of the Lewis acid and its concentration should be adjusted for the particular monomer. Thus, for styrene and isobutene monomers it is preferable to employ a relatively strong Lewis acid such as $TiCl_4$, $BCl_3$ or $SnCl_4$ whereas vinyl ethers can be polymerized using iodine or zinc halides. The Lewis acid is selected to comprise labile ligands such that it does not contain exclusively strongly bonded ligands such as fluorine. Additionally, the strength of these Lewis acids can be adjusted using nucleophilic additives.

The amount of the Lewis acid present in the initiator system may vary; however, it is desirable that the concentration of Lewis acid present preferably exceeds the electron donor or salt concentration present. The Lewis acid concentration should not be so high as to precipitate the formed polymer, e.g., PIB.

Further, an electron donor, proton trap or common ion salt may be optionally present during production of the polymer. These additives have been shown to convert traditional polymerization systems into living and/or quasiliving cationic polymerizations systems; whereby the resulting polymers having controlled structures with narrow molecular weight distribution are produced. The electron donor optionally used in the present invention is not specifically limited to any particular compound or class of compounds, and examples thereof include pyridines and n-alkyl amines, aprotic amides, sulfoxides, esters, metal compounds having an oxygen atom bonded to a metal atom, and others. Specifically, there can be mentioned pyridine compounds such as 2,6-di-tert-butylpyridine (DtBP), 2,6-dimethylpyridine (2,6-DMP), 2,4-dimethylpryidine (2,4-DMP), 2,4,6-trimethylpyridine, 2-methylpyridine, pyridine; N,N-dimethylaniline, aniline; amide compounds such as N,N-dimethylformamide, N,N-dimethylacetamide, N,N-diethylacetamide; sulfoxide compounds such as dimethyl sulfoxide; ether compounds such as diethyl ether; ester compounds such as methyl acetate, ethyl acetate; phosphate compounds such as trimethyl phosphate, tributyl phosphate, triamide hexamethylphosphate; and oxygen-containing metal compounds such as tetraisopropyl titanate. A proton scavenger is defined in U.S. Pat. No. 5,350,819. Electron donors have been defined in EPA 341 012. Both of these documents are incorporated by reference herein. Common ion salts optionally may be added in the living charge. Typically, these salts are used to increase the ionic strength, suppress free ions, and beneficially interact with ligand exchange. Particularly preferred are quaternary ammonium salts, such as n-$Bu_4NCl$. Other suitable salts are disclosed in U.S. Pat. No. 5,225,492.

The invention is suited for the polymerization of hydrocarbon monomers, i.e., compounds containing only hydrogen and carbon atoms, especially olefins and diolefins, and normally those having from two to about twenty, but preferably from about four to eight carbon atoms. The process can be employed for the polymerization of such monomers to produce polymers of different, but uniform molecular weights, for example, from about three hundred to in excess of a million g/mol. Such polymers can be low molecular weight liquid or viscous polymers having a molecular weight of from about two hundred to ten thousand g/mol, or solid waxy to plastic, or elastomeric materials having molecular weights of from about a hundred thousand to a million g/mol, or more. Suitable monomeric materials include such compounds as isobutylene, styrene, beta pinene, isoprene, butadiene, substituted compounds of the preceding types, and others. Particularly preferred monomers are isobutene, 2-methyl-butene, 3-methyl-1-butene, 4-methyl-1-pentene, and beta-pinene. An even more preferred monomer is isobutene. Mixtures of monomers may be used.

Solvents influence the ionization equilbria and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, N-butyl chloride, methylene chloride, methyl chloride, 1,2-dichloroethane, 1,1,2,2-tetrachloroethane, sulfur dioxide, acetic anhydride, carbon tetrachloride, acetonitrile, neopentane, benzene, toluene, methylcyclohexane, chlorobenzene, 1,1-dichloroethane, 1,1-dichloroethene, 1,2-dichloroethene, n-propyl chloride, isopropyl chloride, 1,2-dichloropropane, or 1,3-dichloropropane, to name a few of the representative liquid diluents or solvents useful in cationic polymerizations. Mixed solvents (for example combinations of those listed above) can also be used.

Preferably the polymerization medium is substantially free of substances that are capable of initiating the monomers other than the purposefully-added initiator (or mixture of initiators) employed in this invention. Therefore, the polymerization medium preferably should be substantially free of unwanted cationic polymerization initiators or promoters (i.e., adventitious initiators) such as water, alcohols, carboxylic acids and acid anhydrides, Bronsted acids, ethers or mixtures thereof. The alcohols which should be excluded are straight or branched chain, aliphatic, aromatic, or mixed aliphatic/aromatic alcohols containing from 1 to 30 carbon atoms. Likewise, the carboxylic acid, acid anhydride and/or ether initiators to be excluded are halogen substituted or unsubstituted, straight or branched chain, aliphatic, aromatic or mixed aliphatic/aromatic acids and ethers containing from about 1 to about 30 carbon atoms.

The polymerization reaction medium preferably contains less than about 20 weight ppm (part per million) of water, and less than 5 weight ppm of mercaptans, both of which can function as poisons to Lewis Acid catalysts and/or as adventitious initiators. The olefin feed can be treated to achieve the above desired levels by conventional means, e.g., by use of mole sieves and caustic washing to reduce the concentration of mercaptans and water, and remove dienes (if desired).

The polymerization reaction may be conducted batchwise or as a semicontinuous or continuous operation in which continuous streams of ingredients are delivered to the reactor; appropriate reactor systems include but are not limited to continuously stirred tank reactor systems, wherein an overflow of a slurry or solution of polymer is taken out for the recovery of the polymer therefrom, or plug flow reactors. Preferably, the reactor contents are stirred or agitated to achieve an even catalyst distribution therein. The preferred mode of reaction is a batch process although theoretically a plug flow reactor may have process advantages.

The amount of initiator employed in the process of the present invention can be specified, in conjunction with the reaction temperature, to achieve the target number average molecular weight of polymer. The lower the initiator concentration in the reaction phase, the higher the polymer molecular weight will be and vice versa. Control of the polymer molecular weight within defined limits of a selected target polymer molecular weight is particularly important when the polymer is intended for use in lubricating oils as a dispersant.

The catalyst amount affects the rate of conversion of the olefin monomer and yield of polymer, with higher amounts of Lewis Acid catalyst typically achieving faster conversions and higher yields. Strong Lewis Acid catalyst in the absence of an electron donor species can lead to isomerizations which reduce the functionality of the polymer, and can produce undesirable chain transfer.

In view of the above, and of the fact that the Lewis acid is complexed more or less strongly by reagents which may be present in the reaction medium, the catalyst should be employed in sufficient amount to enable the reaction to proceed at a reasonable rate and in a controlled manner. The preferred catalyst concentration corresponds to about the quantitative formation of complex between the catalyst and the initiator compound. More specifically, the catalyst is employed at a ratio of moles of Lewis acid to equivalents of functional groups on the initiator of more than 3:1, preferably more than 4:1, more preferably more than 6:1, with a preferred range of from 3:1 to 30:1, more preferably 4:1 to 20:1 and most preferably 6:1 to 10:1. When using bifunctional initiators, the Lewis acid to initiator molar ratios are preferably from 3:1 to 5:1.

The polymerization reaction is conducted in the liquid phase to induce linear or chain type polymerization in contradistinction to ring or branch formation. If a feed is used which is gaseous under ambient conditions, it is preferred to control the reaction pressure and/or dissolve the feed in an inert solvent or liquid diluent, in order to maintain the feed in the liquid phase. For butane feeds, typical $C_4$ cuts comprising the feed are liquid under pressure and/or low temperatures and do not need a solvent or diluent.

The temperature at which the polymerizations are carried out is important, since higher temperatures tend to decrease the functionalization degree. Additionally, depending upon the living or quasiliving system, too high a reaction temperature can diminish or eliminate the living character of the cationic polymerization. The usual polymerization temperature range is between about −100° C. and +10° C. Preferably, the polymerizations are performed at a temperature below −10° C., preferably below −20° C., and preferably between −80° C. and −30° C., e.g. at a temperature of about −50° C.

The liquid-phase reaction mixture temperature is controlled by conventional means. The particular reaction temperature is selected to achieve the target living behavior, and preferably is not allowed to vary more than ±5° C. from the selected value. The initiator feed rate is varied to achieve the desired number average molecular weight ($M_n$) to compensate for variations in monomer distribution in the feed composition. These types of fluctuations are minimized by the preferred batch reactor systems.

Average polymerization times can vary from 2 to about 1000, preferably from about 5 to about 120, and most preferably from about 10 to about 60 minutes (e.g., about 20 to about 30 minutes). Preferably polymerization is carried out for a time suitable to allow for monomer conversion above 80% and preferably above 90% and most preferably above 98% and preferably before substantial aging, prior to quenching the living carbocationic polymerization to end cap and thus functionalize the resulting polymer with an N-substituted pyrrole employed in this invention.

Other methods may be used to prepare other pre-made polymers, which are also suitable for functionalization with the N-substituted pyrroles employed in this invention. Suitable pre-made polymers are those made by an inifer technique (described below), from terminated living and quasiliving polymerization products, by conventional polymerizations followed by an extra hydro-chlorination step, or by other polymerization techniques so long that the end result is a polymer backbone having tert-chloride chain ends. Such polymers can be ionized with a suitable Lewis acid catalyst, and thus suitably functionalized with the N-substituted pyrroles described herein. Methods to obtain polymers having a terminal tertiary halide group include use of a system of initiator-transfer agents, called inifers (from initiator-transfer functions). A detailed discussion of the uses for these inifers and the types of telechelic polymers prepared therefrom is found in U.S. Pat. Nos. 4,316,673 and 4,342,849, the disclosures of which are incorporated by reference herein. Such polyisobutylenes terminated with tertiary halides, typically tertiary chlorines, may be combined with a suitable catalyst or Lewis acid and the N-substituted pyrrole quenching agent to produce a functionalized polymer of this invention under the methods described herein.

These pre-made terminally halogenated polymers may be thought of as a substitute for the initiator and monomer present in a living polymerization framework and are treated as equivalent, in terms of end group functionality, to the polymers prepared by the living polymerization of isobutylene. Typically these halogenated polymers are added to the catalyst system by dissolving the polymer in a solvent of choice, much the same way that monomer and initiator are added to a living polymerization charge. The stoichiometry of the catalyst ingredients is calculated assuming that the pre-made polymer is a substitute for the initiator, i.e. one halide terminus is equal to one initiator site. All ingredients are added and equilibrated at the desired temperature before the Lewis acid is introduced. After an equilibration time of 0.5 to 20 minutes, the mixture is considered as the equivalent to the living polymer prepared under these catalyst conditions at complete monomer conversion. Functionalization proceeds according to the method described herein.

Suitable N-substituted pyrroles for end capping the tert-chloride chain end of the quasiliving carbocation polymer are said to be "soft" nucleophiles which means they are amenable to electrophilic aromatic substitution (EAS) by the quasiliving polymer carbocation but not sufficiently nucleophilic to complex with or decompose the Lewis acid. Particularly preferred N-substituted pyrroles are substituted with a component that is less nucleophilic than the pyrrole and which does not deactivate the catalyst complex. The N-substituted pyrrole employed in this invention contains a tertiary nitrogen atom with the lone pair of electrons on the nitrogen taking part in the aromatic sextet of electrons in the five-membered aromatic pyrrole ring. This structure dramatically reduces the complexation of nitrogen with the Lewis acids and increases the nucleophilic character of the aromatic ring, thus creating a soft-nucleophile which is highly reactive with carbenium ions and forms a substantially monoaddition functionalized polymer. Therefore, preferred N-substituted pyrroles are exemplified in part by N-substituted alkyl pyrroles, where substituted alkyl is as defined herein.

Particularly preferred N-substituted pyrroles are illustrated by formula I

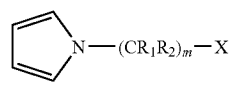

formula I wherein:

$R_1$ and $R_2$ are independently in each —($CR_1R_2$)— unit selected from the group consisting of hydrogen and alkyl from $C_1$ to $C_6$ carbon atoms;

m is an integer from 1 to 20; and

X is selected from the group consisting of hydrogen, alkyl, aryl, alkaryl, alkoxy, heteroaryl, nitro, ureido, —OC(O)$R_3$, —C(O)$R_4$, —C(O)O$R_5$, —C(O)N$R_6R_7$, —P($R_8$)$_3$, —P(O$R_9$)$_3$, —S$R_{10}$, —OSO$_3R_{11}$, and —S(O)$R_{12}$; wherein $R_3$ is alkyl or alkenyl; and $R_4$, $R_5$, $R_6$, $R_7$, $R_8$, $R_9$, $R_{10}$, $R_{11}$, and $R_{12}$ are alkyl.

As illustrated in the Examples in Table 1 below, three un-substituted heteroatomic quenching agents, namely pyrrole, thiophene and furan (Examples A, B and C respectively) reacted with PIB chain ends to yield bimodal or coupled polymers as indicated by the presence of two distinct PIB mass fractions in a gel permeation chromatography (GPC) experiment with a refractive index (RI) detector. Quenching was quantitative with pyrrole and furan while thiophene produced a much lower yield at 43%. GPC data revealed that the low elution volume (high molecular weight) fraction was approximately twice the molecular weight of the high elution volume (low molecular weight) fraction, which is indicative of two PIB chains coupled to the heteroatomic quenching agent. Both furan and thiophene contain two pair of non-bonded electrons with one pair participating in pi conjugation to form an aromatic system (4n+2). Pyrrole has only one pair of non-bonded electrons, which is also required to satisfy the (4n+2) rule for aromaticity. Further analysis by on-line UV indicated that chromophores (aromatic heterocycles) were bonded to both coupled PIB and monofunctional PIB. While not being bound to any theory, it is believed that first a monoaddition product is formed upon reaction of the quenching agent with the quasiliving PIB chain ends. The reaction with furan and thiophene is believed to occur at one of the two equivalent carbons adjacent to the oxygen (C-2), which are of equal reactivity; whereas for pyrrole, it can occur at either the C-2 or C-3 position. After the first alkylation is complete, coupling proceeds by addition of another ionized PIB chain end to the aromatic ring; the second PIB chain can react at either the C-3, C-4, or C-5 positions on the 2-PIB-furan and 2-PIB-thiophene. However, PIB imposes significant steric hindrance on the C-3 site and thus, promotes reaction at the C-4 and C-5 carbons. Reaction at C-5 is favored due to resonance stabilization of the allylic carbocation, which is generated on C-4. This is supported by quantitative analysis of $^1$H NMR data which indicate nearly 66% of the coupled PIB formed by addition at C-2 and C-5 in furan samples, and even higher percentages were calculated when PIB was quenched with thiophene.

The alkylation of PIB-pyrrole is much less selective and can therefore occur at any hydrogen-bearing carbon remaining on the ring to yield four different constitutional isomers (2-5,2-3, 3-4, and 2-4). Thus, blocking of the reactive site(s) on the pyrrole was undertaken to determine if controlled monoaddition could be achieved as was observed for 2-methylfuran and 2-methylthiophene (Examples C1 and B1 respectively). In the case of thiophene and furan, it is easy to rationalize how the reaction is limited to monoaddition by a 2-alkyl substituent; the alkyl group directly blocks the most reactive, remaining site against the second addition, and sterically hinders the second addition at C-3 and C-4. As illustrated by the Examples A1, A2 and B2,2,4-dimethylpyrrole and 2,5-dimethylpyrrole, as well as 3-methylthiophene, resulted in low or no conversion of functionalized material. It would appear that alkylation of specific sites on the heteroatomic rings provides substantial steric hindrance or direct blocking, which inhibits in-situ functionalization of ionized PIB chains.

Surprisingly, N-substituted pyrroles as demonstrated by 1-methylpyrrole (Example 1) and 1-furfurylpyrrole (Example 2) underwent controlled monoaddition of quasiliving PIB chain ends, whereas unsubstituted pyrrole (Example A-0) functioned as an effective coupling agent. N-substituted pyrrole is not blocked at any position available for electrophilic aromatic substitution (EAS), yet only one of two sites is reacted. While not being bound to any theory, the results can be explained sterically and electronically, since substituent groups stabilize carbocations and promote electrophilic addition but also impose steric limitations to subsequent substitutions. PIB-N-methylpyrrole is less reactive than N-methylpyrrole towards EAS because of steric hinderance, in spite of the favorable inductive effect; thus coupling does not occur. Pyrrole is less reactive than PIB-pyrrole and upon monoaddition at the 2 or 3 positions, becomes more susceptible to EAS even though PIB imparts significant steric hindrance. The 2- or 3-PIB-pyrroles produced in situ compete with the remaining pyrrole for activated PIB chain ends and produce coupled material.

Similarly, the difunctional quenching agent, 1-furfurylpyrrole, which contains two "soft" heterocyclic nucleophiles connected by a methylene spacer group, also led to monoaddition on the pyrrole moiety. 1-Furfurylpyrrole was utilized as a quenching agent to produce PIB chain ends containing multiple heteroatomic, aromatic rings. Once placed on the PIB chain end, both rings can be either reduced and/or further reacted in a post-polymerization procedure. 1-Furfurylpyrrole exhibits the desired substitution regarding both heteroatomic rings—the pyrrole group is alkylated on nitrogen and furan is substituted at C-2. GPC characterization (Table 1) of PIB aliquots quenched with 1-furfurylpyrrole in excess of the chain end concentration (Example 2) presented a single mass fraction of PIB ($M_n$=theoretical) and a single distribution of PIB containing chromophores (UV). GPC analysis indicated that coupling did not occur or the amount of coupled material (2 PIB chain attached to one quenching agent) was lower than the level of detection. This discovery was surprising given the fact that 1-furfurylpyrrole has two reactive sites towards alkylation (C-2/3 on pyrrole and C5 on furan). NMR characterization of the quenched product indicated that tert-Cl and olefinic chain ends were absent and that most PIB were bonded directly to the pyrrole ring. Quantitative analysis by $^1$H NMR showed that the PIB chains alkylated 1-furfurylpyrrole as follows: C-3 position of pyrrole (57%), the C-2 carbon of pyrrole (34%), and the C-5 site on furan (9%). The pyrrole ring appears to be much more reactive towards EAS, and moreover, coupling is inhibited once monoaddition of either ring has occurred. This procedure represents a novel method for the single-step production of PIB containing multiple heteroatomic chain ends. Quantitative conversion of quasiliving PIB-Cl to monofunctional PIB-1-furfurylpyrrole can be carried out in the absence of chain coupling by maintaining the [QA]/[chain end] ratio greater than 1.0.

Further experiments were designed to induce coupling through decreasing the QA/chain end stoichiometric ratio to approximately 0.50 (Table 1, Example 3). NMR characterization revealed that less than 50% of 1-furfurylpyrrole became disubstituted; however, 31% of PIB-Cl structures were retained. Coupling was found to occur through di-addition at either the C-2 or C-3 position of pyrrole and the C-5 carbon on furan. These results are consistent with previous reports that maintain coupling of PIB through bis(furanyl) and bis(diphenylethylene) derivatives is inefficient due to deactivation of the second ring upon monoaddition of quasiliving PIB.

The chemistry of preparing the suitable N-substituted pyrrole compounds for use in this invention is well known in the art; see for example, *The Synthesis, Reactivity, and Physical Properties of Substituted Pyrroles*, Volume 48, Part 1-2, John Wiley and Sons (1992) incorporated herein by reference in its entirety. Illustrative examples of N-substituted pyrroles which can be suitably employed in the present invention include: N-alkylpyrroles, e.g., N-methylpyrrole, N-ethylpyrrole, N-propylpyrrole, N-isopropylpyrrole, N-butylpyrrole, N-sec-butylpyrrole, N-hexylpyrrole, N-heptylpyrrole, N-octylpyrrole; N-substitutedalkylpyrroles, N-benzylpyrrole, 1-furfurylpyrrole, 1-thiophurylpyrrole, pyrrol-1-methyl pyridine, N-alkoxypyrroles, 1-methoxymethyl-1H-pyrrole, 1-ethoxymethyl-1H-pyrrole, 1-propoxymethyl-1H-pyrrole, 1-butoxymethyl-1H-pyrrole, pyrrol-1 ylmethyl urea, N,N-dimethyl-2-pyrrol-1-yl acetamide, N,N-dimethyl-3-pyrrol-1-yl propionamide and the like.

At a temperature range of from about –80° C. to about –10° C. a high conversion (i.e. generally greater that about 90%) of isobutene (IB) monomer occurs within 60 minutes employing BCl$_3$ Lewis acid. Typically, the conversion is about 95% complete within 90 minutes. In addition to relatively slow propagation rates, BCl$_3$ catalyzed reactions promote relatively slow quenching rates. Typically, less that 50% conversion of tert-Cl chain ends to pyrrole moieties occurs within 15 minutes. Higher conversions are reached when reaction times approach 60 minutes. This is attributed to a lower ionization equilibrium in a BCl$_3$ system which yields lower concentrations of reactive carbenium ions available for reaction with an N-substituted pyrrole of this invention employed as a quenching agent. Using a TiCl$_4$ catalyst promotes faster propagation rates and more rapid quenching rates due to the larger ionization equilibrium associated with this system.

Techniques under which the living polymer or a polymer terminated with a halogen and the N-substituted pyrrole are combined are typical conditions known to those of ordinary skill in the art, such as, but not limited to, suspending the N-substituted pyrrole in a solvent and thereafter combining with the neat, suspended or dissolved living polymer. The neat N-substituted pyrrole may also be directly added to the neat, suspended or dissolved living polymer to thereby quench the polymerization. The quenching with the N-substituted pyrrole covalently bonds the N-substituted pyrrole to the carbocationic center of the living or quasiliving polymer, thus functionalizing the living polymer. The number of N-substituted pyrrole functional groups on the functionalized polymeric N-substituted pyrrole is determined by the number of initiator sites in the initiator used to create the living polymer or the polymer terminated with tertiary halides. For example, initiation of isobutylene from 2-chloro-2,4,4-trimethylpentane leads to a polymer with one propagating center and thus one functional group per polymer. Whereas 1,3,5-tri (2-chloro-2-propyl)benzene will produce a polymer with three functional groups. Particularly preferred are monodisperse, N-substituted pyrrole-functionalized cationic polymers having substantially no coupled N-substituted pyrrole functionalization.

The molecular weight of the polymer chain can be manipulated by varying the ratio of the concentrations of the monomer to the initiator as in most living polymerizations. See for example U.S. Pat. Nos. 5,350,819; 5,169,914; and 4,910,321, which are incorporated by reference herein.

The present invention is directed to polymers having at least one terminal N-substituted pyrrole moiety, and these functionalized polymers can be derived from any suitable cationically polymerizable monomers. Thus the functionalized polymers can be homopolymers having substantially the same repeating monomer unit, or copolymers having two or more different repeating units. Particularly, AB block copolymers and ABA triblock copolymers can be formed. The functionalized polymers may also contain various hydrocarbyl headgroups based upon the selection of the initiator. The initiator can either mimic the growing chain end, e.g. a 1-phenylethyl derivative for polystyrene or 2,4,4-trimethylpentyl derivative for polyisobutene, or may impart some desired group such as alkyl, benzyl, tolyl, silyl, etc. Additionally, by employing polyfunctional initiators, so called star polymers can be formed. Thus, examples of the functionalized polymers can be represented by (Initiator residue)-(P-polymer)-(N substituted Pyrrole) or by multifunctional initiators (N-substituted Pyrrole)-(P-polymer)-(multifunctional Initiator residue)-[(P-polymer) -(N-substituted Pyrrole)]$_q$ where q+1 equals the functionality of the initiator. Additionally, coupling agents can be employed to link P-polymer chains. As illustrated above, the initiator residue can be depicted by the carbocation ($^+CR_aR_b)_nR_c$, with $R_a$, $R_b$, $R_c$, and n as defined herein above; P-polymer represents a polymer segment from at least one cationically polymerizable monomer; therefore, the functionalized N-substituted pyrrole polymers can be homopolymers, random or block copolymers, etc., and -(P-polymer)-(N-substituted Pyrrole) can be independently selected and thus be the same or different at each occurrence.

In a preferred embodiment as little as one equivalent of an N-substituted pyrrole per chain end is sufficient to carry out the functionalization. Greater amounts of N-substituted pyrrole are of course useful; however the preferred ranges of N-substituted pyrrole to chain end are 1 to 20 equivalents per chain end, preferably 1 to 5 equivalents per chain end, even more preferably 1 to 2 equivalents per chain end. (Chain ends are determined by ascertaining the number of initiation sites per initiator molecule and multiplying that number by the number of initiator molecules present.) Typically the reaction is rapid and quantitative at various temperatures. The N-substituted pyrrole may be added neat or more preferably as a solution of the pyrrole in the chosen solvent for the polymerization. The addition may be singular and immediate or may be a more slowly controlled, metered addition. Additionally, the N-substituted pyrrole may be added with additional Lewis acid catalyst, proton trap, electron donor, or any combination thereof which are typical components of the aforementioned living polymerization systems. In a preferred embodiment the Lewis acid does not irreversibly react with the N-substituted pyrrole.

Once the living polymer has been reacted with the N-substituted pyrrole, it may be used in that form or modified to form another functional group by known chemistries. For example the functional group may be reduced, oxidized, hydrogenated and/or hydrolyzed. These reactions may be performed in the same reactor since isolation of the functionalized N-substituted pyrrole containing polymer is optional.

After quenching, the polymerization product is typically subjected to conventional finishing steps which include a caustic/$H_2O$ wash to extract catalyst residue, a hydrocarbon/aqueous phase separation step wherein deactivated and extracted Lewis Acid catalyst is isolated in the aqueous phase, and a water washing step to remove residual amounts of neutralized catalyst. The polymer product is then typically stripped in a debutanizer to remove unreacted volatile monomers, such as isobutene, followed by a further stripping procedure to remove light end polymer (e.g., $C_{24}$ carbon polymer). The stripped polymer product is then typically dried by nitrogen.

A class of preferred products of this invention have a narrow molecular weight distribution (Mw/Mn), preferably of about 4 or less, more preferably of about 2.5 or less, even more preferably 1.75 or less and even more preferably 1.5 or less, and most preferably 1.2 or less. Typically ranges are from 1.1 up to 1.4. Likewise, the methods described above produce polymers having a greater degree of functionalization than previously available by commercially viable processes. In a preferred embodiment the degree of functionalization is about 70% or more, preferably 80% or more, even more preferably 90% or more, as determined by proton NMR.

The novel functionalized N-substituted pyrrole polymers of this invention comprise terminally substituted polymers derived from any of the above-discussed cationically polymerizable monomers. The functionalized polymers will preferably contain at least 4 monomer units (M) per polymer chain, and will more usually be characterized by number average molecular weights of at least 350 and up to 1,000,000 g/mol or more. The molecular weight range can be determined for particular polymers. However, preferred functionalized polymers generally range in molecular weight from 500 to 500,000 and generally up to 100,000 g/mol for use as lubricant additives; and with specific ranges of 20,000 to 100,000 g/mol for use as viscosity improvers and from 500 to 20,000 g/mol for use as dispersants and detergents. Particularly useful detergent and dispersant functionalized polymers have an average molecular weight of from about 500 to 5,000, preferably 500 to 3,000, more preferably 700 to 2,000, and most preferably from about 700 to 1,500 g/mol. The low molecular weights are number average molecular weights measured by vapor phase osmometry. Low molecular weight polymers are useful in forming dispersants for lubricant additives and particularly useful are low molecular weight N-substituted pyrrole polymers. The preparation of the polymers of the present invention can be conducted in a manner and under conditions to attain various molecular weight polymers. The polymers can be conveniently characterized based on molecular weight range. Polymers and copolymers of low, <20,000 g/mol, intermediate, <100,000 g/mol, and high, i.e., <1,000,000 g/mol, molecular weights can be prepared.

Fuel Compositions

The compounds of the present invention, particularly those represented by formula II, are useful as additives in hydrocarbon distillate fuels boiling in the gasoline or diesel range. Particularly preferred compounds of formula II have a low molecular weight and even more preferably, n is selected from 2 to 20. The proper concentration of additive necessary in order to achieve the desired detergency and dispersancy varies depending upon the type of fuel employed, the presence of other detergents, dispersants, and other additives, etc. Generally, however, from about 25 to 7,500 ppm by weight, preferably from about 25 to 2,500 ppm, of the present additive per part of base fuel is needed to achieve the best results.

The deposit control additive may be formulated as a concentrate, using an inert stable oleophilic organic solvent boiling in the range of from about 150° F. to 400° F. (or 65° C. to 200° C.). Preferably, an aliphatic or an aromatic hydrocarbon solvent is used, such as benzene, toluene, xylene or higher-boiling aromatics or aromatic thinners. Aliphatic alcohols of from about 3 to 8 carbon atoms, such as isopropanol, isobutylcarbinol, n-butanol, and the like, in combination with hydrocarbon solvents are also suitable for use with the detergent-dispersant additive. In the concentrate, the amount of the present additive will be from about 10 weight percent and generally not exceed about 70 weight percent, preferably from about 10 to 50 weight percent and most preferably from about 20 to 40 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, hydrocarbyl poly(oxyalkylene) aminocarbamates, succinimides, or Mannich bases. Additionally, antioxidants, metal deactivators and demulsifiers may be present.

In diesel fuels, other well-known additives can be employed, such as pour point depressants, flow improvers, cetane improvers, and the like.

A fuel-soluble, nonvolatile carrier fluid or oil may also be used with the functionalized polymers of this invention. The carrier fluid is a chemically inert hydrocarbon-soluble liquid vehicle, which substantially increases the nonvolatile residue (NVR), or solvent-free liquid fraction of the fuel additive while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils. Such carrier fluids are described, for example, in U.S. Pat. No. 4,191,537, and polyesters, such as those described, for example, in U.S. Pat. Nos. 3,756,793 and 5,004,478, and in European Patent Application Nos. 356,726, published Mar. 7, 1990, and 382,159, published Aug. 16, 1990. These carrier fluids are believed to act as a carrier for the fuel additives of the present invention and to assist in removing and retarding deposits. The carrier fluid may also exhibit synergistic deposit control properties when used in combination with a functionalized polymer of this invention.

The carrier fluids are typically employed in amounts ranging from about 25 to 7,500 ppm by weight of the hydrocarbon fuel, preferably from about 25 to 2,500 ppm of the fuel. Preferably, the ratio of carrier fluid to deposit control additive will range from about 0.5:1 to 10:1, more preferably from about 0.5:1 to 4:1, most preferably about 0.5:1 to 2:1. When employed in a fuel concentrate, carrier fluids will generally be present in amounts ranging from about 20 to 60 weight percent, preferably from about 30 to 50 weight percent.

EXAMPLES

The invention is further illustrated by the following examples, which are not to be considered as limitative of its scope.

Example 1

Linear monofunctional PIB was synthesized using the following conditions: Hexane/Methyl chloride (MeCl) 60/40 v/v; temperature −70° C.; [TMPCl]=0.014M; [TiCl$_4$]=0.083 M; [2,6-DMP]=0.01 M; [IB]=0.5 M. Polymerizations were carried out under dry nitrogen gas in a glove-box. Masterbatch solutions (400 mL) including IB, solvent, TMPCl, and 2,6-DMP were allowed to mix thoroughly and reach thermal equilibrium for 15 min prior to initiation with TiCl$_4$. Upon initiation, the polymerization solution was immediately divided into 30 mL aliquots (via a pre-chilled 50 mL graduated cylinder) and placed in 50 mL test tubes equipped with threaded caps. At the appropriate reaction time (98% IB conversion—determined from previous kinetic experiments) the polymerizations were terminated with either 10 mL pre-chilled MeOH (control) or quenched with a nucleophilic quenching agent.

Terminated reaction mixtures were allowed to warm to room temperature and low boiling components were volatilized. A volume of hexane (2-3 mL) was added to each sample to dissolve the PIBs, and then the polymers were precipitated into MeOH. Finally, the isolated PIBs were shaken vigorously with fresh MeOH to remove any remaining salts and dried by vacuum stripping. Samples prepared for gel permeation chromatography (GPC) and nuclear magnetic resonance (NMR) characterization were dried in a vacuum oven maintained at 40° C. for at least 24 hours prior to analysis.

Table 1 lists the GPC and NMR data for the various quenching agents. Notably, if the % yield is reported as zero, the functionalization of the PIB-Cl was completely unsuccessful and the resulting PIB retained the tert-Cl end group or dehydrochlorinated to form an olefin. Samples which eluted in two distinct fractions according to GPC analysis were termed bimodal (B); samples exhibiting a single fraction were termed monomodal (M). In bimodal (coupled) samples, the fraction of material that eluted first (highest molecular weight) contained two PIB chains per molecule of quenching agent (light scattering analysis indicated the initial fraction was precisely twice the molecular weight of the unquenched PIB-Cl), and the final eluting fraction contained only one PIB chain per molecule of quenching agent. The significance of the GPC results is clearly illustrated by comparing Sample 1 with Sample A-0 in Table 1. The conversion of chain ends to pyrrole functionalities was 100% in both pyrrole and N-methylpyrrole reactions; however, the fraction of pyrrole rings containing two PIB chains was much higher than in the reaction involving N-methylpyrrole. These findings are significant since the properties of the final oil/fuel additive are highly dependent on the number of substituents directly bonded to the heteroatomic ring. Furthermore, in situ functionalization with N-substituted pyrroles (charge ratio of quencher/chain end remains greater than 1.0) produces materials with a molecular weight distribution ($M_w/M_n$), MWD, less than 1.15 (Examples 1 and 2). However, samples (e.g., Examples A-0, B-0, and C-0) which illustrated coupled fractions in the GPC traces exhibited MWDs greater than 1.40. From this data, it is clear that in situ functionalization of living or quasiliving cationic polymerizations with appropriate quenching agents can yield monodisperse, telechelic materials.

Using $^1$H NMR, integrated peak areas of the resonances associated with the functionalized end groups relative to those for all chain end protons were treated using the following equation:

$$F(PIB-X) = \frac{A_{PIB-X}}{A_{tert-Cl} + A_{exo} + A_{endo} + A_{PIB-X}}$$

where $A_{PIB-X}$ is the normalized area associated with characteristic proton(s) of the quenched product (e.g., $A_{PIB-X}/3$ for N-methylpyrrole), $A_{exo}$ is the average area of the two olefinic protons of the exo isomer (4.85 and 4.63 ppm) and $A_{endo}$ is the area of the single olefinic resonance at 5.15 ppm. $A_{tert-Cl}$ was calculated according to the following expression: $A_{tert-Cl} = (A_{1.65-1.72})/6 - A_{5.15}$; where $A_{1.65-1.72}$ is the convoluted, integrated area associated with the methyl protons of the endo and tert-Cl chain ends (1.65-1.72 ppm).

Similar procedures as above were carried out to prepare Examples 2 and 3 as well as comparative Examples A-0 through C-6 of Table 1.

TABLE 1

| Example | Quenching Agent (QA) | QA (M) | QA (g) | GPC Trace[a] | % Yield[b] |
|---|---|---|---|---|---|
| 1 | 1-Methylpyrrole | 0.015 | 0.050 | U | 100 |
| 2 | 1-Furfurylpyrrole | 0.030 | 0.165 | U | 100 |
| 3 | 1-Furfurylpyrrole | 0.007 | 0.040 | B | 69 |
| A-0 | Pyrrole | 0.015 | 0.040 | B | 100 |
| A-1 | 2,4,-Dimethylpyrrole | 0.015 | 0.058 | U | 18 |
| A-2 | 2,5-Dimethylpyrrole | 0.015 | 0.057 | U | 0 |
| B-0 | Thiophene | 0.015 | 0.051 | B | 43 |
| B-1 | 2-Methylthiophene | 0.015 | 0.057 | U | 100 |
| B-2 | 3-Methylthiopene | 0.015 | 0.059 | B | 33 |
| C-0 | Furan | 0.015 | 0.040 | B | 100 |
| C-1 | 2-Methylfuran | 0.015 | 0.050 | U | 100 |
| C-2 | Furfurylalcohol | 0.015 | 0.058 | U | 0 |
| C-3 | Furfurylacetate | 0.015 | 0.084 | U | 0 |
| C-4 | Furfurylamine | 0.015 | 0.058 | U | 0 |
| C-5 | N,N-Diacetylfurfurylamine | 0.120 | 0.109 | U | 0 |
| C-6[c] | 2-Furanacrylonitrile | 0.120 | 1.224 | U | 0 |

[a]Qualitative shape of refractive index trace acquired by GPC: B = bimodal; U = unimodal;
[b]Percent yield based on fraction of PIB-Cl converted to functionalized PIB as determined by $^1$H NMR.
[c]Reaction conditions: Hexane/MeCl 60/40 v/v; temperature −70° C.; [chain end] = 0.06 M; [TiCl4] = 0.018 M; [2,6-DMP] = 0.01 M; [IB] = 2.0 M; quench time = 15 minutes.

Examples 4-6

Similar to the method utilized in Example 1, two additional sets of quenching trials were conducted using analogous quenching agents. The polymerizations and quenching reactions were carried out under the following sets of conditions: 1) MeCl; temperature −45° C.; [TMPCl]=0.024 M; [BC13]=0.50 M; [2,6-DMP]=0.01 M; [IB]=0.6 M; 2) 1,2-EtCl2; temperature −10° C.; [TMPCl]=0.024 M; [BCl3]=0.25 M; [2,6-DMP]=0.01 M; [IB]=0.6 M. The time allowed for quenching equaled 70 minutes after 98% conversion of IB, for each condition. NMR and GPC were used to characterize the products and the data are listed in Table 2. As in the previous examples, bimodal samples exhibited much higher MWDs than unimodal samples (Examples 4 and 5). Comparative Examples A-3 through C-8 were also prepared in accordance with this method and the results are presented in Table 2.

TABLE 2

| Example | Quenching Agent (QA) | QA (M) | QA (g) | GPC Trace[a] | % Yield[b] Rnx 1[1] | % Yield[b] Rnx 2[2] |
|---|---|---|---|---|---|---|
| 4 | 1-Methylpyrrole | 0.048 | 0.12 | U | 20 | 60 |
| 5 | 1-Furfurylpyrrole | 0.012 | 0.05 | U | <5 | <5 |
| 6 | 1-Furfurylpyrrole | 0.048 | 0.21 | B | 32 | — |
| A-3 | Pyrrole | 0.048 | 0.10 | B | 15 | 50 |
| A-4 | 2,4,-Dimethylpyrrole | 0.048 | 0.14 | U | 0 | 0 |
| A-5 | 2,5-Dimethylpyrrole | 0.048 | 0.14 | U | 0 | 0 |
| B-3 | Thiophene | 0.048 | 0.12 | B | <5 | 78 |
| B-4 | 2-Methylthiophene | 0.048 | 0.12 | U | 70 | 100 |
| B-5 | 3-Methylthiopene | 0.048 | 0.14 | B | 5 | 84 |
| C-7 | Furan | 0.048 | 0.10 | B | 8 | 90 |
| C-8 | 2-Methylfuran | 0.048 | 0.15 | U | 20 | 100 |

[1]Reaction conditions: MeCl; temperature −45° C.; [TMPCl] = 0.024 M; [BCl3] = 0.50 M; [2,6-DMP] = 0.01 M; [IB] = 0.6 M; quench time = 70 minutes.
[2]Reaction conditions: 1,2-EtCl2; temperature −10° C.; [TMPCl] = 0.024 M; [BCl3] = 0.25 M; [2,6-DMP] = 0.01 M; [IB] = 0.6 M; quench time = 70 minutes
[a]Qualitative shape of refractive index trace acquired by GPC: B = bimodal; U = unimodal;
[b]Percent yield based on fraction of PIB-Cl converted to functionalized PIB as determined by NMR.

Example 7

A 2 L roundbottom flask was chilled to −70° C. Charged to the flask were 460 mL of anhydrous hexane, 307 mL of anhydrous methyl chloride, 21.24 g of 2-chloro-2,4,4-trimethylpentane (TMPCl), 1.16 mL 2,6-lutidine, and 161 mL of anhydrous isobutene (IB). The solution was stirred for 15 minutes. Polymerization was initiated by adding 47 mL of TiCl$_4$ to the solution. After 3 minutes, 25.4 mL of 1-methylpyrrole was added to quench the polymerization and allowed to react for 12 minutes to thereby functionalize the PIB chain end. To the reaction 120 mL of anhydrous MeOH was added, and the reaction was stopped.

Polymer samples were extracted from the mixture at intermittent reaction times and were added to separate scintillation vials containing 10 mL chilled, anhydrous MeOH. These samples were subjected to GPC analysis and NMR spectroscopic characterization.

The final PIB-substituted-N-methylpyrrole was dissolved in hexane. The organic layer was washed with 5% v/v HCl/deionized H$_2$O solution, washed with pure deioinized H$_2$O, and dried over MgSO$_4$. Solids were filtered from the solution and hexane was removed by vacuum distillation to produce the final product. The product had an approximate molecular weight of M$_n$=1,300 g/mol and $^1$H NMR analysis indicated that 100% of PIB chains contained N-methylpyrrole structures.

Example 8

A 250 mL roundbottom flask was chilled to −10° C. Charged to the flask were 156 mL of anhydrous methylene chloride (CH$_2$Cl$_2$), 1.18 g isopropyl alcohol, 0.24 mL 2,6-lutidine, and 36.0 mL of anhydrous isobutene. The solution was stirred for 15 minutes. Polymerization was initiated by adding 5 mL of BCl$_3$ to the solution. After 65 minutes, 3.10 mL of N-methylpyrrole was added to the polymerization and allowed to react for 70 minutes. The quenching reaction was stopped by addition of 20 mL of anhydrous MeOH.

Polymer samples were extracted from the mixture at intermittent reaction times and were added to separate scintillation vials containing 10 mL chilled, anhydrous MeOH. These samples were subjected to GPC analysis and NMR spectroscopic characterization.

The final PIB-substituted-N-methylpyrrole was dissolved in hexane. The organic layer was washed with 5% v/v HCl/deionized $H_2O$ solution, washed with pure deionized $H_2O$, and dried over $MgSO_4$. Solids were filtered from the solution and hexane was removed by vacuum distillation to produce the final product.

Example 9

Deposit Control Evaluation

In the following tests, the PIB-substituted N-methylpyrrole ($M_n$=1,300 g/mol) as prepared in Example 7 of the present invention was blended in gasoline and its deposit control capacity tested in an ASTM/CFR Single-Cylinder Engine Test.

In carrying out the tests, a Waukesha CFR single-cylinder engine was used. Each run was carried out for 15 hours, at the end of which time the intake valve was removed, washed with hexane and weighed. The previously determined weight of the clean valve was subtracted from the weight of the valve. The difference between the two weights is the weight of the deposit. A lesser amount of deposit measured indicates a superior additive. The operating conditions of the test were as follows: water jacket temperature of 200° F.; manifold vacuum of 12 in. Hg; air-fuel ratio of 12; ignition spark timing of 400 BTC; engine speed of 1,800 rpm; the crankcase oil was a commercial 30 W oil. The amount of carbonaceous deposit in milligrams on the intake valves was measured and reported in the following Table 3.

TABLE 3

| | Intake Valve Deposit Weight (in milligrams) | | |
| --- | --- | --- | --- |
| SAMPLE | RUN 1 | RUN 2 | AVERAGE |
| Base Fuel | 204.3 | 192.5 | 198.4 |
| N-methyl PIB pyrrole [EXAMPLE 7][1] | 131.7 | 134.6 | 133.2 |

[1] 50 ppma (parts per million actives) of N-methyl PIB pyrrole and 50 ppm of α-hydroxy-ω.-4-dodecylphenoxypoly(oxypropylene) having an average of 12-13 oxypropylene units (prepared essentially as described in Example 6 of U.S. Pat. No. 4,160,648) carrier oil The base fuel employed in the above single-cylinder engine tests was a regular octane unleaded gasoline containing no fuel detergent. The test compounds were admixed with the base fuel to give a concentration of 50 ppma (parts per million actives) of the PIB-substituted-N-methylpyrrole and 50 ppm of α-hydroxy-ω-4-dodecylphenoxypoly(oxypropylene) having an average of 12-13 oxypropylene units (prepared essentially as described in Example 6 of U.S. Pat. No. 4,160,648) as a carrier oil.

The data in Table 3 illustrate the reduction in intake valve deposits provided by the functionalized polymers of the present invention even at a very low concentration. It is further anticipated that hydrogenation of the ring of the N-methyl-PIB pyrrole would further enhance performance.

Example 10

Hydrogenation—Preparation of Polyisobutyl-Substituted N-Methylpyrrolidine

To a 50 mL glass hydrogenation vessel was added 6 g of 10% Pd on charcoal catalyst and to this was added 59.5 g glacial acetic acid. Then 8.02 g (6.2 mmol) of a 50/50 mixture of 2-and 3-polyisobutenyl-substituted N-methylpyrrole ($M_n$=1,300 g/mol) was added. The reaction vessel was then attached to a Parr hydrogenator and 50 psig hydrogen pressure was applied. The reaction was hydrogenated at 25-30° C. for 18 hours. Then the reaction mixture was filtered and toluene added. The product was washed first with 20% KOH in water, then with water, and then the product was dried over anhydrous $MgSO_4$. The product from this reaction, the 2-and 3-polyisobutyl-substituted N-methylpyrrolidine was characterized by positive ion electrospray ionization mass spec. ESI-MS. The ESI-MS gave peaks at m/z of 366, 422, 478, 534, 590, 646, 702 etc. which are characteristic of the ammonium salt of the desired product with the following structures:

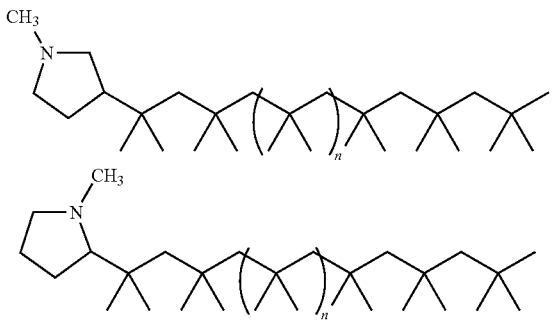

What is claimed is:

1. A method for preparing an in situ telechelic polymer functionalized by having a heteroatomic chain end group, comprising quenching a cationic living polymer product or a terminal tert-chloride chain end of a carbocationic quasiliving polymer product in the presence of a Lewis acid, with an N-substituted pyrrole of formula I

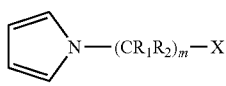

formula I wherein:

$R_1$ and $R_2$ are independently in each —$(CR_1R_2)$— unit selected from the group consisting of hydrogen and alkyl from $C_1$ to $C_6$ carbon atoms;

m is an integer from 1 to 20; and

X is selected from the group consisting of hydrogen, alkyl, aryl, alkaryl, alkoxy, heteroaryl, nitro, ureido, —OC(O)$R_3$, —C(O)$R_4$, —C(O)O$R_5$, —C(O)N$R_6R_7$, —P($R_8$)$_3$, —P(O$R_9$)$_3$, —S$R_{10}$, —OSO$_3R_{11}$, and —S(O)$R_{12}$; wherein $R_3$ is alkyl or alkenyl; and $R_4$, $R_5$, $R_6$, $R_7$, $R_8$, $R_9$, $R_{10}$, $R_{11}$, and $R_{12}$ are alkyl.

2. The method of claim 1, wherein the quasiliving polymer product is formed by contacting at least one cationically polymerizable monomer with an initiator, in the presence of a Lewis acid and solvent under suitable quasiliving polymerization reaction conditions.

3. The method of claim 2, wherein said initiator is monofunctional.

4. The method of claim 3, wherein the initiator is selected from the group consisting of 2-chloro-2-phenylpropane; 2-acetyl-2-phenylpropane; 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, and 2-ethoxy-2,4,4-trimethylpentane.

5. The method of claim 2, wherein said initiator is bifunctional.

6. The method of claim 5, wherein the initiator is selected from the group consisting of 1,4-di(2-chloro-2-propyl)benzene, 1,4-di(2-methoxy-2-propyl)benzene, and 5-tert-butyl-1,3,-di(2-chloro-2-propyl) benzene.

7. The method of claim 6, wherein the initiator is 5-tert-butyl-1,3, -di(2-chloro-2-propyl) benzene.

8. The method of claim 2, wherein said initiator is multifunctional.

9. The method of claim 8, wherein the initiator is selected from the group consisting 1,3,5-tri(2-chloro-2-propyl)benzene) and 1,3,5-tri-2-methoxy-2-propyl)benzene.

10. The method of claim 2, wherein the at least one cationically polymerizable monomer is selected from the group consisting of isobutene, 2-methyl-1-butene, 3-methyl-1-butene, 4-methyl-1-pentene, and beta-pinene.

11. The method of claim 10, wherein the at least one cationically polymerizable monomer is isobutylene.

12. The method of claim 2, wherein two different cationically polymerizable monomers are employed.

13. The method of claim 2, wherein the Lewis acid is selected from the group consisting of titanium tetrachloride, boron trichloride, aluminum trichloride, tin tetrachloride, zinc chloride, and ethyl aluminum dichloride.

14. The method of claim 13, wherein the Lewis acid is selected from the group consisting of titanium tetrachloride and boron trichloride.

15. The method of claim 2, wherein the quasiliving polymerization reaction conditions are selected to have a temperature range from between about $-100°$ C. and $+10°$ C.

16. The method of claim 15, wherein the quasiliving polymerization reaction conditions are selected to have a temperature range below $-10°$ C.

17. The method of claim 16, wherein the quasiliving polymerization reaction conditions are selected to have a temperature range between $-80°$ C. and $-30°$ C.

18. The method of claim 1, wherein the molecular weight distribution of the polymer Mw/Mn is less than 1.5.

19. The method of claim 1, wherein the molecular weight of the polymer is a number average molecular weight from 500 to 500,000 g/mol.

20. The method of claim 19, wherein the number average molecular weight of the polymer is up to 100,000 g/mol.

21. The method of claim 1, wherein the N-substituted pyrrole of formula I is one wherein m is an integer from 1 to 6.

22. The method of claim 1, wherein the N-substituted pyrrole of formula I is selected from the group consisting of N-methylpyrrole, N-ethylpyrrole, N-propylpyrrole, N-isopropylpyrrole, N-butylpyrrole, N-sec-butylpyrrole, N-hexylpyrrole, N-heptylpyrrole, N-octylpyrrole; N-substituted alkyl pyrrole, N-benzylpyrrole, 1-furfurylpyrrole, 1-thiophurylpyrrole, pyrrol-1-methyl pyridine, N-alkoxypyrrole, pyrrol-1ylmethyl urea, N,N-dimethyl-2-pyrrol-1-yl acetamide, and N,N-dimethyl-3-pyrrol-1-yl propionamide.

23. The method of claim 1, wherein the N-substituted pyrrole of formula I is N-methylpyrrole.

24. The method of claim 1, further comprising contacting the functionalized polymer produced by quenching the quasiliving carbocationic living polymer and N-substituted pyrrole with a hydrogenation agent under reactive conditions.

25. The method of claim 1, wherein the N-substituted pyrrole of formula I is selected from the group consisting of N-methylpyrrole, N-ethylpyrrole, N-propylpyrrole, N-isopropylpyrrole, N-butylpyrrole, N-sec-butylpyrrole, N-hexylpyrrole, N-heptylpyrrole, N-octylpyrrole; N-substituted alkyl pyrrole, N-beazylpymle, 1-furfurylpyrrole, 1-thiophurylpyrrole, pyrrol-1-methyl pyridine, N-alkoxypyrrole, 1-methoxymethyl-1H-pyrrole, 1-ethoxymethyl -1H-pyrrole, 1-propoxyniethyl-1H-pyrrole, 1-butoxymethyl-1H-pyrrole, pyrrol-1ylmethyl urea, N,N-dimethyl-2-pyrrol-1-yl acetnmide, and N,N-dimethyl-3-pyrrol-1-yl propionamide.

* * * * *